C. D. BABCOCK.
HERTZIAN WAVE METER.
APPLICATION FILED MAY 27, 1908.
918,256.
Patented Apr. 13, 1909.
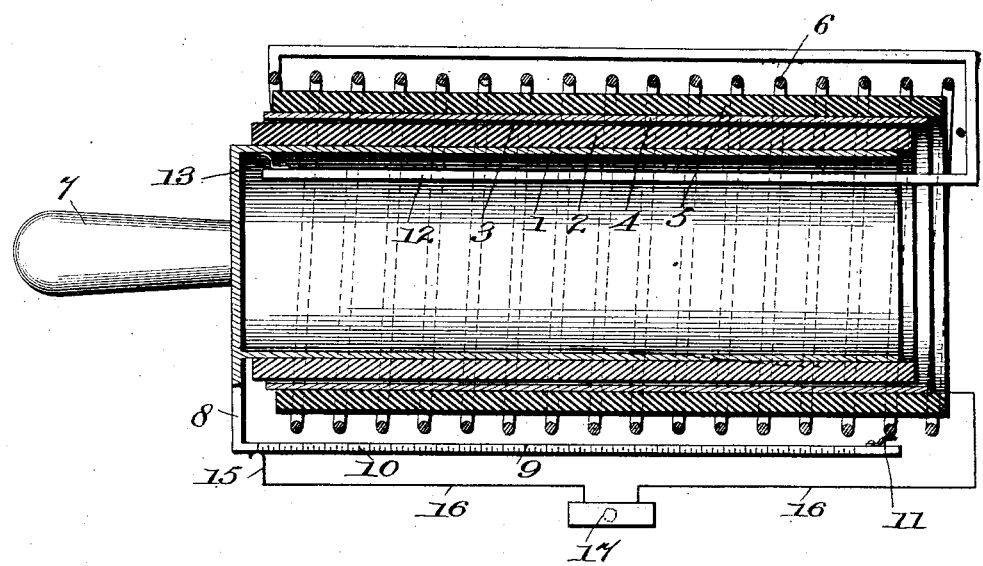
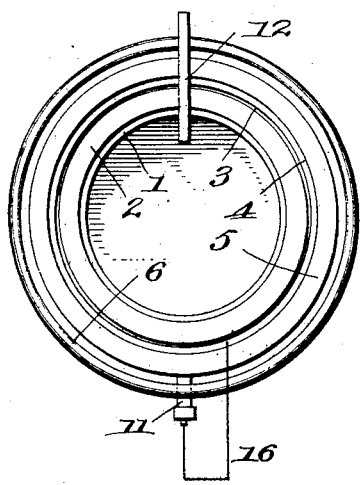
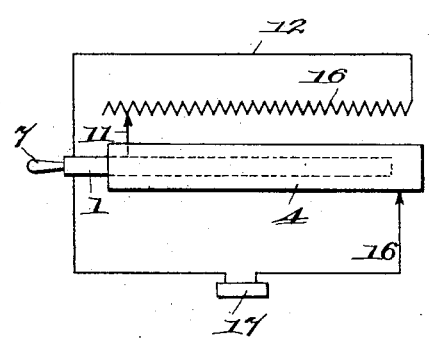

UNITED STATES PATENT OFFICE.

CLIFFORD D. BABCOCK, OF NEW YORK, N. Y., ASSIGNOR TO THE UNITED WIRELESS TELEGRAPH COMPANY, A CORPORATION OF MAINE.

HERTZIAN-WAVE METER.

No. 918,256.　　　　Specification of Letters Patent.　　　Patented April 13, 1909.

Application filed May 27, 1908.　Serial No. 435,289.

*To all whom it may concern:*

Be it known that I, CLIFFORD D. BABCOCK, a citizen of the United States, residing at New York, in the county of New York and State of New York, have invented certain new and useful Improvements in Hertzian-Wave Meters; and I do hereby declare the following to be a full, clear, and exact description of the invention, such as will enable others skilled in the art to which it appertains to make and use the same.

My invention relates to improvements in Hertzian wave meters, and the object of my invention is to produce such a meter that will be efficient in action, and comparatively cheap to manufacture.

Another object of my invention is to produce such a meter that will have a greater compactness combined with a more rigid and durable construction than those heretofore produced as well as the possibility of a closer reading.

It is well known in Hertzian-wave wireless telegraphy, that the distance to which it is possible to propagate signals depends among other things upon the wave length used, and that therefore, it is very desirable to know the lengths of the waves emitted when operating a wireless station. In measuring these waves, however, the sending apparatus should not be disturbed; and it is customary to employ a closed oscillation circuit provided with a suitable capacity and inductance each of which may be adjusted at will. It is also well known that the frequency in an oscillating circuit varies inversely as the square root of the product of the capacity and inductance; and therefore, we may, by suitably adjusting these quantities, cause the instrument itself to indicate the length of the particular waves that may be impinging thereon at the moment.

With the above objects in view, my invention consists in a condenser, composed of a pair of concentric metal cylinders, suitably insulated from, and adjustable longitudinally with relation to each other, provided with an inductance and suitable wave measuring devices, all as more fully hereinafter disclosed and particularly pointed out in the claims.

Referring to the accompanying drawings forming a part of this specification, in which like numerals refer to like parts in all the views:—Figure 1, is a longitudinal sectional view through the cylinders and inductance of my wave meter. Fig. 2, an end elevational view of the same, and Fig. 3, a diagram of the electric circuit employed.

1, represents an inner metallic cylinder, preferably of brass; 2, a cylinder of insulating material, preferably of ebonite, surrounding and attached to said brass cylinder 1; 3, an air space; 4, an outer metallic preferably brass cylinder concentric with cylinder 1; 5, an insulating preferably ebonite cylinder, surrounding and attached to cylinder 4; and 6, an inductance preferably a copper wire coiled around the ebonite cylinder 5, as shown.

7, is a suitable insulating handle, preferably of ebonite, for sliding cylinder 1 in and out of cylinder 4; and 8 is a metallic arm rigid with cylinder 1, and provided with the graduated extension 9, bent at right angles to said arm, and extending outside of and parallel to the axes of said coil and cylinders, as shown. The extension 9, is provided with the scale 10, and the resilient metallic contact 11, which makes connection with successive coils of the inductance 6, beginning at the end opposite the handle 7, while the cylinder 1, and consequently the extension 9, slides longitudinally. In other words, the construction so far described constitutes a condenser, the capacity of which may be varied at will by simply moving the cylinder 1, in and out of cylinder 4. And this condenser is surrounded by the inductance 6, joined with the cylinder 1, and capable of being varied in value as the said cylinder is moved in and out. The spirals of inductance 6, should be wound with open turns, as shown, or else they should be well insulated from each other with ebonite or some other good insulator which does not vary with the frequency. A distance of from one eighth to one fourth of an inch between spirals will give good results.

12, represents a metallic conductor such as an arm of copper tubing, which passes inside cylinder 1; and which through its resilient metal contactor 13, makes a sliding contact with said cylinder, as shown. Said arm 12, is bent up over the coil 6, and is at its other extremity joined to said coil 6, at that end of said coil which is near the handle 7. That is to say, the contactor 11 and extension 9, adjustably joins said cylinder 1 with one end of coil 6, and contactor 13 and arm 12, joins said cylinder with the other end of said coil; but the first mentioned connection is adapted to cut in and cut out convolutions of said coil as the cylinder 1 is adjusted, while the second always connects said cylinder and the first turn of said coil 6, no matter how much the cylinders 1 and 4 may be displaced relatively to each other.

15, is a resilient contactor adapted to slide relatively to extension 9, and 16 is a wire connecting said contactor with the indicating instrument 17, and the cylinder 4. The instrument 17, may be a hot wire galvanometer, a thermo-couple, or it may be a vacuum tube, or any other suitable indicating device.

The circuit is diagrammatically shown in Fig. 3, from which it will be seen that there is in series with one of the condenser plates formed by the insulated cylinder 1, the variable inductance 6, and that the indicating instrument 17 is in a shunt across the condenser cylinders, the circuit of this shunt being completed through the condenser from cylinder 4 to cylinder 1.

The operation of my wave meter is as follows:—The capacities of the cylinder condenser is first measured for the various positions of the two cylinders; and the inductances of the spirals of the coil 6, included in the circuit, are likewise measured for the positions of the contactor 11, corresponding to the various capacities determined. If C denotes the capacity of the cylinders for any position, and L the inductance of that part of the spiral included in the circuit for the position in question, then the quantities L C, or oscillation constants, which determine the wave lengths, can be readily determined for various positions. As is well known, if the oscillation constant is known for any particular circuit, then the frequency of the oscillation for that circuit is obtained by dividing the number five millions by its oscillation constant. Also, it is known that the velocity with which Hertzian waves travel, when emitted from an aerial, is about one thousand million feet per second, and that the relation between their wave lengths and their frequency is expressed by the fact that the wave length in feet multiplied by their frequency is approximately equal to the number one thousand millions. Again, the frequency in any circuit depends upon the oscillation constant, as above, and it is well known that the wave length in feet equals two hundred multiplied by the oscillation constant. So that either of the above relations will readily enable the wave length to be determined. For instance, suppose a sending aerial is emitting wireless telegraph waves, the cylinder 1 will be adjusted by means of the handle 7 until the vacuum tube glows brightest or the other indicator 17 shows its proper reading. When such is found to be the fact, the oscillation constant of the instrument agrees with that of the aerial, and the numerical value of the wave length, or frequency can be read upon the scales, according to whether it is graduated for wave lengths, or wave frequencies, and provided of course the oscillation constant lies within the range of the instrument.

Of course, I do not limit myself to the exact details of construction disclosed, since it is evident that the same may be varied without departing from the spirit of my invention.

What I claim is:—

1. In a Hertzian wave meter the combination of a pair of insulated metallic cylinders constituting a condenser; an inductance coil surrounding said cylinders; a sliding connection between said coil and one of said cylinders; a sliding connection between said latter cylinder and said coil; and a wave indicator connected to both of said cylinders, substantially as described.

2. In a Hertzian wave meter the combination of a pair of insulated metallic cylinders adapted to slide one within the other and constituting a condenser; an inductance coil surrounding the outer of said cylinders; a sliding connection between said coil and the inner one of said cylinders; a sliding connection between said latter cylinder and said coil; and a wave indicator connected to both of said cylinders, substantially as described.

3. In a Hertzian wave meter the combination of a pair of concentric metallic cylinders insulated from each other, the inner of which is provided with an arm and an extension parallel to its axis; an inductance coil surrounding the outer of said cylinders; a sliding connection between said extension and one convolution of said coil; a sliding connection between said inner cylinder and the other end of said coil; and means to indicate the lengths of impinging waves, substantially as described.

4. In a Hertzian wave meter the combination of a pair of concentric metallic cylinders insulated from each other, the inner of which is provided with an arm and an extension parallel to its axis having a scale, an inductance coil surrounding the outer of said cylinders; a sliding connection between said extension and one convolution of said coil; a sliding connection between said inner cylinder and the outer end of said coil, consisting of an arm having two parallel portions located inside and outside of said cylinders; and means to indicate the lengths of impinging waves, substantially as described.

5. In a Hertzian wave meter the combination of an inner metal cylinder provided with an ebonite insulating cover; an outer metal cylinder, also, provided with an ebonite insulating cover; said inner cylinder being capable of freely sliding in said outer cylinder, there being an air space between the cylinders; a coil of wire constituting an inductance surrounding said outer cylinder; an extension provided with a scale rigid with and disposed substantially parallel to said inner cylinder; a resilient sliding connection between one convolution of said coil and said extension; an arm connected to the other end of said inductance, extending over the outside of said coil and then bent back upon itself to extend inside said inductance, and provided with a resilient sliding connection with said inner cylinder; a sliding contact registering with said scale; a wave indicator; a connection between said sliding contact and said wave indicator; and a connection between said wave indicator and said outer cylinder, substantially as described.

In testimony whereof, I affix my signature, in presence of two witnesses.

CLIFFORD D. BABCOCK.

Witnesses:
 MOSES ELY,
 JOSEPH S. HUNT.